United States Patent
Sturdevant et al.

[19]

[11] Patent Number: 5,822,989
[45] Date of Patent: Oct. 20, 1998

[54] THERMOCHEMICAL/MECHANICAL BRAKE AND CLUTCH UNIT

[75] Inventors: Michael L. Sturdevant, Painesville; Griffin M. Allen, Jr., Shaker Heights; Edward T. Schneider, Eastlake, all of Ohio

[73] Assignee: TCAM Technologies, Inc., Mentor, Ohio

[21] Appl. No.: 656,761

[22] Filed: Jun. 3, 1996

[51] Int. Cl.⁶ ........................................................ F03G 7/06
[52] U.S. Cl. .......................... 60/528; 192/82 T; 192/85 C
[58] Field of Search ............................ 60/527, 528, 530; 192/82 T, 85 C

[56] References Cited

U.S. PATENT DOCUMENTS

| | | | |
|---|---|---|---|
| 2,005,468 | 6/1935 | Modine | 192/82 T |
| 2,938,384 | 5/1960 | Soreng et al. | 73/358 |
| 2,961,827 | 11/1960 | Cox | 60/528 |
| 2,989,281 | 6/1961 | Fritts | 251/11 |
| 4,081,963 | 4/1978 | Stove | 60/528 |
| 4,258,899 | 3/1981 | Huelle et al. | 251/11 |
| 4,553,393 | 11/1985 | Ruoff | 60/528 |
| 4,685,651 | 8/1987 | Nouvelle et al. | 251/11 |
| 5,025,627 | 6/1991 | Schneider | 60/527 |
| 5,177,969 | 1/1993 | Schneider | 60/527 |
| 5,288,214 | 2/1994 | Fukuda et al. | 417/395 |
| 5,419,133 | 5/1995 | Schneider | 60/527 |
| 5,685,149 | 11/1997 | Schneider et al. | 60/528 |

FOREIGN PATENT DOCUMENTS 701621   1/1965   Canada .
365011 A2   4/1990   European Pat. Off. .

OTHER PUBLICATIONS

Technical Specification No. Cod.82.0331.00 (Italy) May 7, 1991 Eltek S.p.A.
"PTC Thermistors, Introduction to PTC Overload Protection", Philips Components, Mar. 31, 1995 pp. 225–228.
"High–Output Paraffin Linear Motors: Utilization in Adaptive Systems", Tibbitts, SPIE V. 1543 Active & Adaptive Optical Components (1991) pp.388–398.
"Electrothermal Microactuators Based On Dielectric Loss Heating", Rashidian, et al., Proc. IEEE Micro Electro Mech Sys–An Invest of Micro Structures, Sensors, Actuators, Mach & Sys; Ft. Lauderdale, FL Feb. 7–10 '93 pp. 24–29.

*Primary Examiner*—Noah P. Kamen
*Attorney, Agent, or Firm*—Fay, Sharpe, Beall, Fagan, Minnich & McKee

[57] ABSTRACT

An actuator (A) includes a body (10) in which a plurality of chambers or bores (34) are defined. The bores are interconnected at an inner end by an elongated passage (30). A heater element (32) extends along the elongated passage. The elongated passage and the inner portion of each chamber or bore are filled with a polymeric material which expands and flows on heating, preferably undergoing a solid to liquid phase change. Extensible members (12), such as pistons, diaphragms, bellows, or the like, are mounted in the bores or wells. When the heater heats the polymeric material causing it to expand and flow, the extensible elements (12) extend under high force with limited travel. In one embodiment, the extension of the extensible members moves a thrust bearing (B) causing frictionally engageable plates (18, 22) of a friction member assembly (C) to engage.

21 Claims, 4 Drawing Sheets

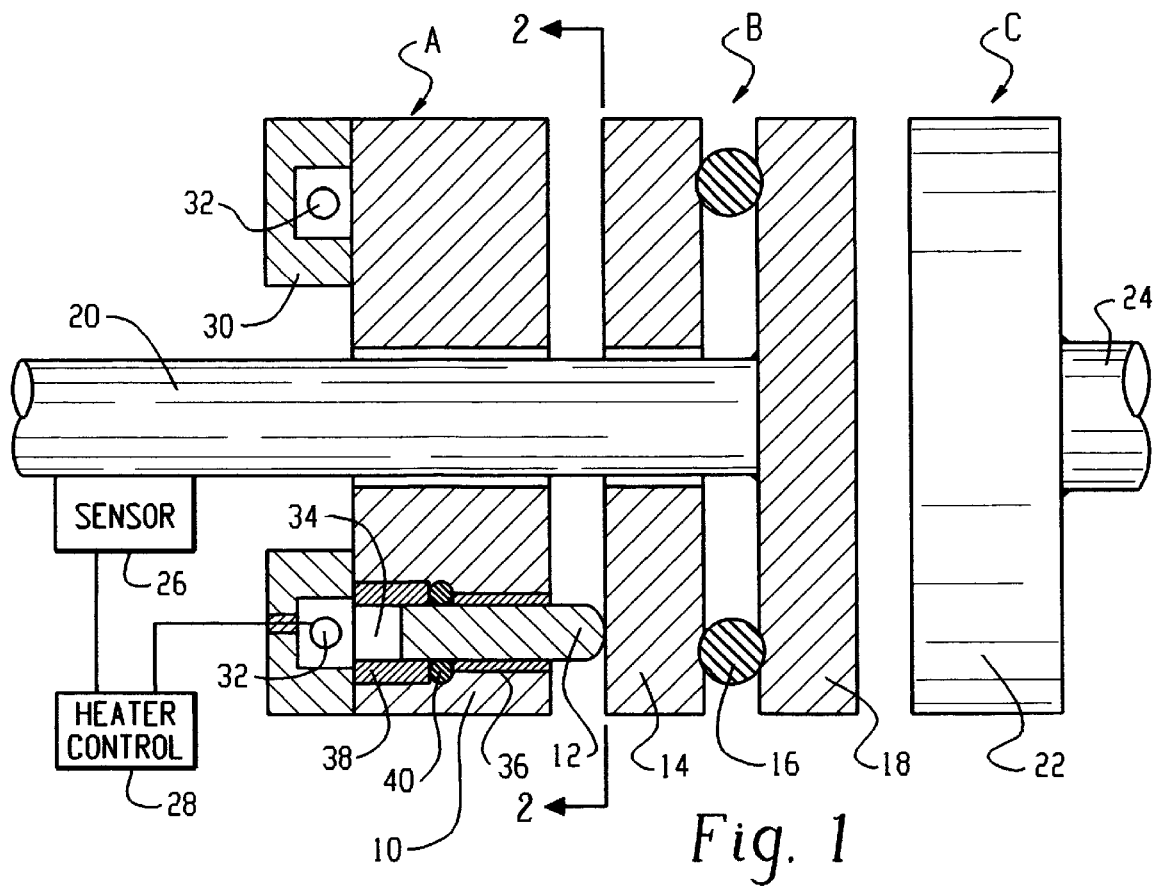
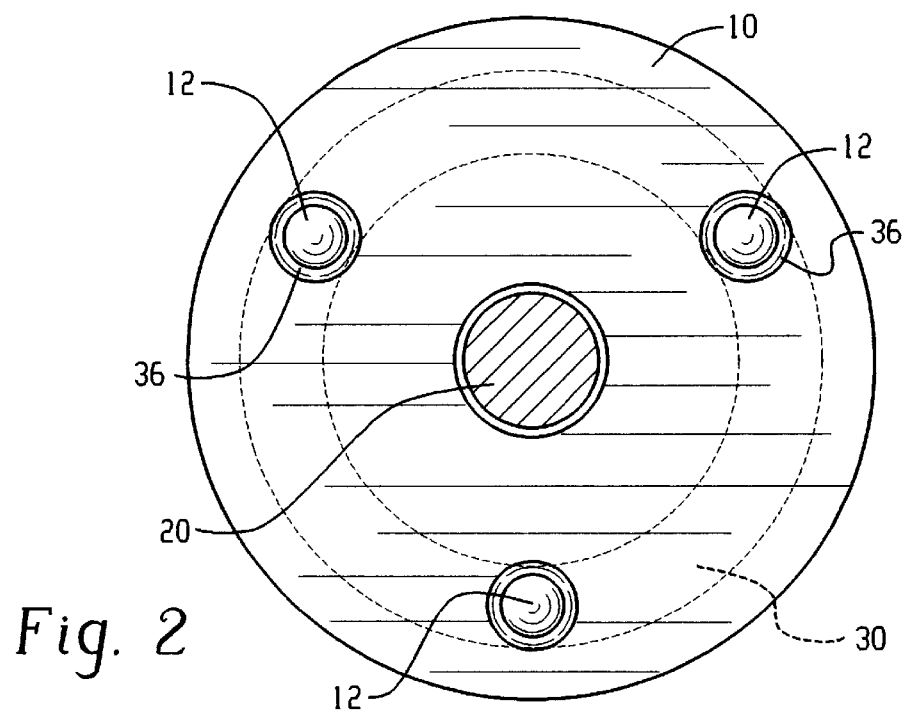

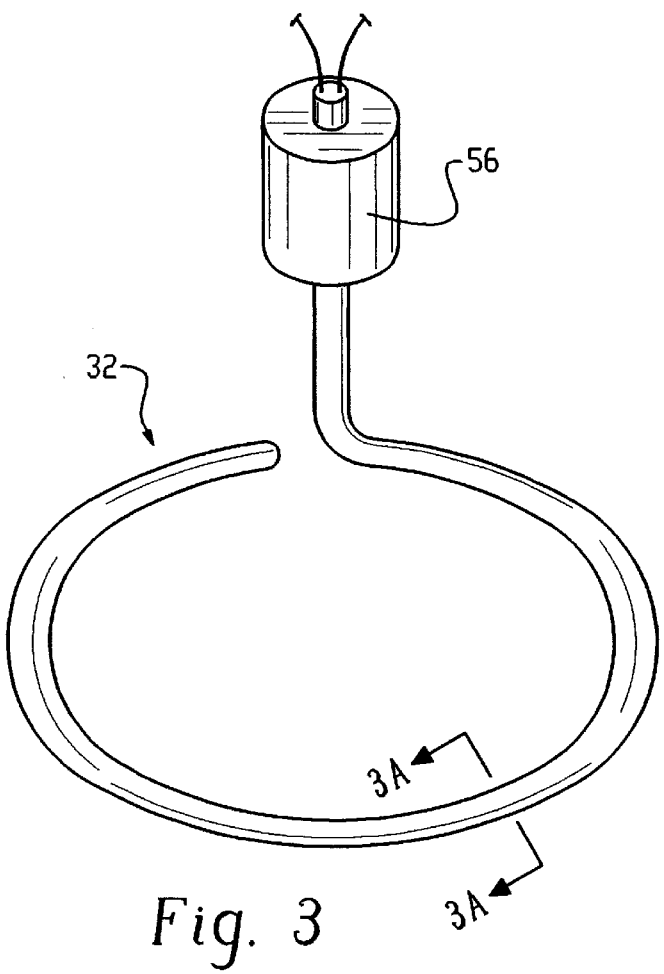
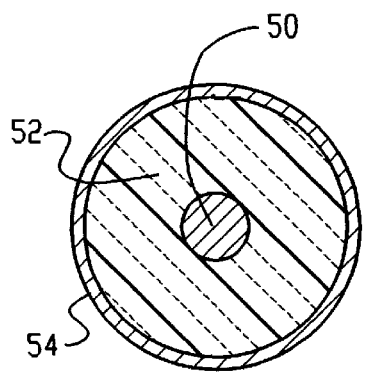
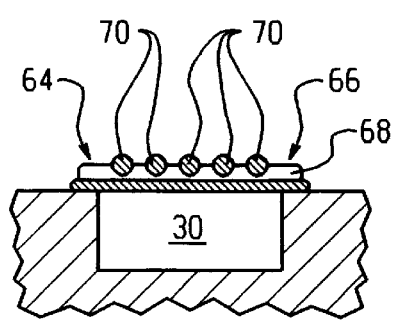
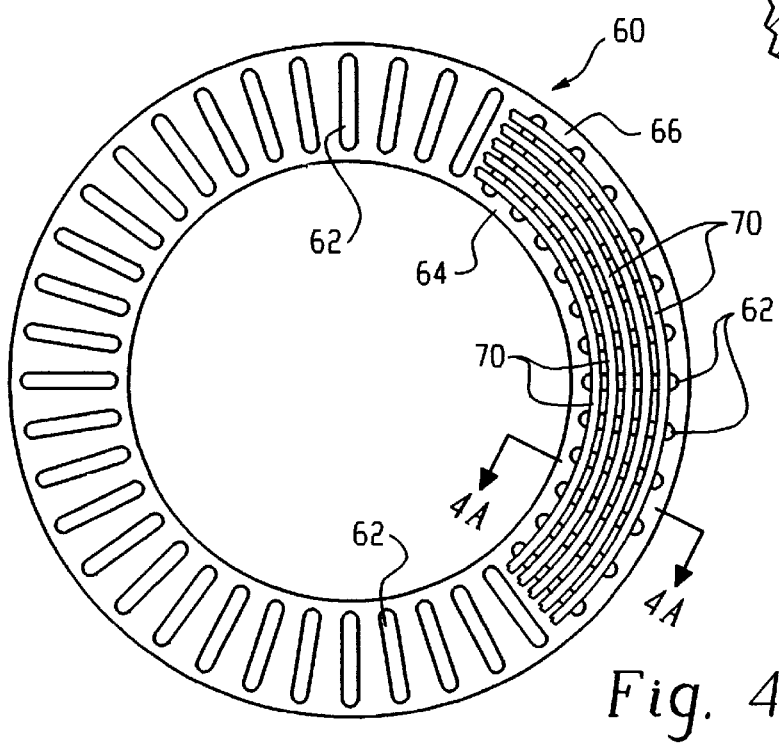

THERMOCHEMICAL/MECHANICAL BRAKE AND CLUTCH UNIT

BACKGROUND OF THE INVENTION

The present invention relates to mechanical power actuators. It finds particular application in conjunction with high force, low travel extensible actuators for brakes, clutches, and the like, and will be described with particular reference thereto. However, it is to be appreciated that the invention will also find application in conjunction with tension control mechanisms, automated chuck mechanisms, chain tension mechanisms, presses, drum brakes, collar brakes, and the like.

Applicant's prior U.S. Pat. Nos. 5,025,627, 5,177,969, and 5,419,133 illustrate a mechanical actuator which provides forces equal to and exceeding the forces that are readily available from hydraulics. Heat is applied, typically in the form of an electrical current through a resistance heater, to a wax or polymer material within a confined chamber. Heating causes expansion of the wax or polymer material, causing a piston or other mechanical member to extend. Selecting a wax or polymer which goes through a phase change during the heating accentuates the expansion of the polymer and the force/travel of the extensible member. At relatively short travels, these prior actuators achieve forces on the order of 10,000–20,000 psi, and higher.

Although successful, one drawback of these prior thermochemical/mechanical actuators resides in coordinating the movement of multiple actuators. Through the use of feedback control circuitry, the applicant has been able to control the extension of these actuators with high precision. However, such feedback control circuits tend to be relatively expensive and bulky.

The present invention contemplates a new and improved sealed chamber actuator which overcomes the above-referenced problems and others.

SUMMARY OF THE INVENTION

In accordance with one aspect of the present invention, a new and improved electromechanical actuator is provided. An elongated passage contains polymeric material which expands and flows when heated. A heater element is disposed along the elongated passage. A plurality of chambers are disposed in fluid communication with the elongated passage. An extensible member is mounted in each chamber such that as a polymeric material expands and flows, a common force is exerted on each of the extensible members urging each to extend.

In accordance with a more limited aspect of the present invention, the elongated passage is annular.

In accordance with another more limited aspect of the present invention, extension of the extensible members causes engagement of a thrust bearing which urges frictional contact between selectively mating friction members, such as a clutch or brake.

In accordance with another aspect of the present invention, a brake or clutch assembly is provided. First and second clutch or brake friction members are selectively movable between a frictional engaging relationship and a spaced, disengaged relationship. An actuator selectively moves the friction plates between the spaced, disengaged relationship and the frictional engaging relationship. The actuator includes a housing which defines at least one chamber therein. An extensible member is mounted at least partially within the chamber for selective movement between a retracted position and an extending position. A polymeric material is disposed in the chamber below the extensible member. A heater disposed in thermal communication with the polymeric material selectively heats the polymeric material, causing it to flow and expand.

In accordance with a more limited aspect of the present invention, the housing includes a plurality of the chambers each containing the polymeric material and an extensible member. An elongated passage interconnects the chambers.

One advantage of the present invention is that it enables a plurality of extensible members to extend with like extension and force characteristics.

Another advantage of the present invention resides in its relative simplicity.

Other advantages of the present invention reside in its low cost and high reliability.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 1 is a cross-sectional view of an annular thermochemical mechanical actuator in accordance with the present invention in combination with a thrust bearing and a clutch or brake plate;

FIG. 2 is a top view of the annular actuator of FIG. 1;

FIG. 3 is a detailed view of one embodiment of a heater for the annular actuator of FIGS. 1 and 2;

FIG. 3A is a cross-sectional view through section 3A—3A of FIG. 3;

FIG. 4 is another embodiment of the heater of FIG. 3;

FIG. 4B is a sectional view through section 4A–4A of FIG. 4;

DETAILED DESCRIPTION OF THE PREFERRED EMBODIMENTS

Figure 5:
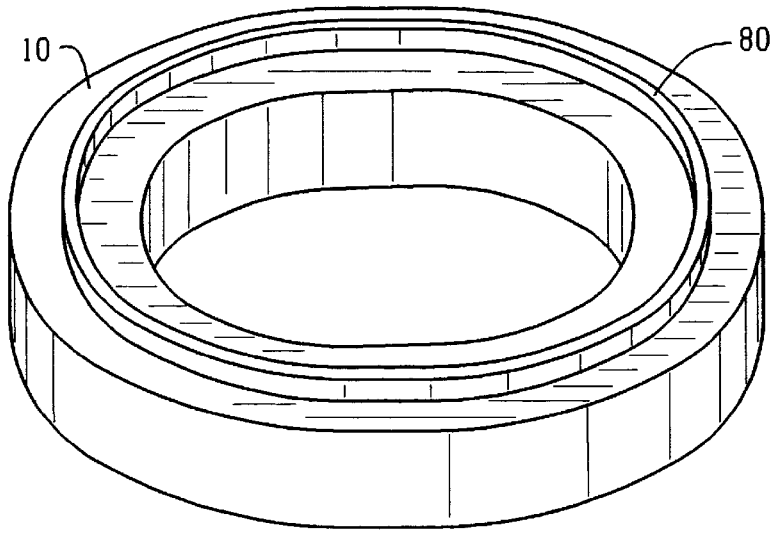
FIG. 5 is an alternate, annular piston embodiment of the thermochemical/mechanical actuator.

A thermochemical/mechanical actuator A which includes a body portion 10 is fixed against longitudinal, and preferably rotational movement. A plurality of axial, longitudinally extensible members 12 extend from the body during actuation. The extensible members 12 press against a longitudinally movable, but preferably rotationally stationary, plate 14 of a thrust bearing B, a hydrodynamic bearing, or other actuation mechanism. Ball or roller bearings 16 connect the first plate 14 of the thrust bearing with a second or output plate 18 which is connected with a shaft 20. When the longitudinally extensible members 12 extend, pressure on the first thrust bearing plate moves the whole thrust bearing assembly, including the output plate and the shaft 20 longitudinally, engaging a brake or clutch plate 22 of a friction member assembly C.

In the clutch embodiment, the clutch plate 22 is connected with a second shaft 24. One of shafts 20 and 24, preferably shaft 24, is connected with a source of motive power, such as an engine or motor. The other shaft, preferably shaft 20, is connected with associated equipment that is selectively connected to the motive power source and disconnected from the motive power source. Extension of the members 12 moves the thrust bearing and friction member assembly into locking frictional engagement such that the shafts 20 and 24 are frictionally locked to rotate together.

In a brake embodiment, one of the shafts 20, 24, preferably shaft 24, is connected with a rotating member, e.g., the wheel of a vehicle. The output plate 18 of the thrust bearing is locked against rotational movement. Actuation of the actuator presses the thrust bearing, or an associated braking surface, against the brake plate 22, causing frictional braking. It will be appreciated that in this embodiment, the shaft 20 is locked against rotation or can be eliminated.

In a tension control embodiment, a sensor 26 senses the rotational speed of the output shaft, e.g., shaft 20, the tension on a web that is driven by rotation of shaft 20, or the like. In response to the sensed condition, an actuator control 28 adjusts the degree of extension and/or amount of force of the longitudinal extension members 12 to adjust the degree of frictional engagement between the thrust bearing B and the friction member assembly C which is connected to the source of motive power.

With continuing reference to FIG. 1 and further reference to FIG. 2, the body member 10 of the thermochemical/mechanical actuator A defines an elongated, preferably annular channel 30 which extends around the body member. For manufacturing simplicity, the body is preferably constructed of two steel members which are welded. An electrical heater 32 is mounted in the annular channel 30 for selectively heating a polymer, wax, metal alloy, or other phase change or thermally expansible material therein. The housing further defines a plurality of bores 34, three in the preferred embodiment, in communication with the annular channel 30. The pin or other longitudinally extensible member 12 is disposed in each bore. Other suitable extensible members include snap domes, bellows, differential pistons, and the like. More specifically to the preferred embodiment, each bore receives a bearing and seal 36 about an upper portion of the bore. A compression sleeve 38 compresses a gasket, such as an O-ring 40, sufficiently to provide an effective seal to prevent the polymer from flowing along the sides of the longitudinally extensible member and escaping. Other gasket or seal mechanisms, such as a diaphragm, bellows, other gasket configurations, or the like, are also contemplated.

In operation, the control 28 causes the heater element 32 to commence heating the polymer material, melting and expanding it. Polymer along the heater element melts first, establishing a fluid reservoir of the polymer extending along the heating element. With continued heating, more of the polymer melts and expands, causing the elements 12 to extend. The fluid path between the bores 34 defined by the flowable polymer surrounding the heater element provides a pressure equalization path such that the same pressure is developed in each bore. Equalized pressure in the bores causes the extension members 12 to extend with like force. When the heater is turned off, the polymer cools and contracts, causing a like contraction of the members 12. Preferably, a spring force is provided which urges the extension members to return to their initial position.

Various heat removal techniques may be employed to accelerate cooling and retraction. The housing body 10 may simply have sufficient heat capacity or be thermally connected with other structures which do. Alternately, air or other gaseous fluids may be passed over the housing body 10 to cool it. As another embodiment, liquids may be passed over or through passages in the housing body 10 to cool it. For example, the entire body may be immersed in a coolant bath such as oil or water. Alternately, passages can be defined within the body 10 through which a coolant fluid is circulated. The coolant circulation may be controlled by a pump connected with the output shaft. In this manner, if the unit starts to overheat, the extension members 12 extend engaging the clutch and commencing the pumping of the coolant.

With reference to FIGS. 3 and 3A, the heater element 32 of the preferred embodiment is a cable or tube type heater. A resistive heating element 50 extends along the center of the heater, such as an Imonel, nichrome, nickel, or other resistance wire. The wire is surrounded by a magnesium oxide or other electrical insulator 52 which has good thermal conductive properties. A sheath, such as a stainless steel sheath 54 surrounds the assembly. In DC applications, the sheath 54 provides a current return path for the current flowing through the resistive element 50. In AC applications, a grounded return is provided within the sheath. Alternately, the coil could extend in a full loop such that both ends of the resistance wire pass through a high pressure fitting 56, that provides a high pressure seal with the housing body.

With reference to FIGS. 4 and 4A, other heaters are also contemplated. For example, an annular carrier 60 of insulating material defines a multiplicity of openings 62 therethrough, at least adjacent the chambers 34. The opening provides transverse passages to permit the polymer to flow across the carrier and into the bores 34. Inner and outer annular edges 64 and 66 provide clamping edges for clamping the carrier 60 centered within the annular passage 30. An adhesive layer 68 fixes the position of each of a plurality of windings of resistive wires 70, such as copper, nichrome, nickel, or the like. optionally, other wire mounting mechanisms, such as a series of clips or guides, may also be utilized. optionally, another adhesive or mounting layer may be mounted to the opposite face of the polymeric carrier 60 to accommodate a second set of heater wires. Moreover, a plurality of these units can be stacked. In a direct connection embodiment, ends of the windings 70 are connected through a high pressure feedthrough and are connected with the heater control 28. In an inductive embodiment, the ends of the windings 70 are connected to each other in a loop to function as the secondary winding of a transformer. A primary winding is disposed adjacent the housing and the power is conveyed by induction from the primary to the secondary winding. In this manner, high pressure feedthroughs are eliminated.

Figure 5A:
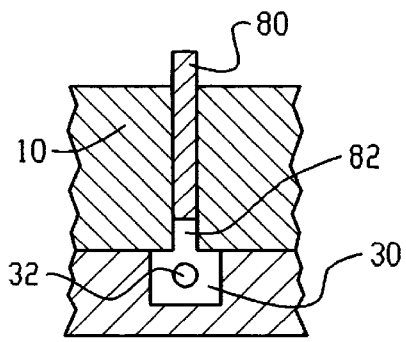
FIG. 5A illustrates a cross-section of one embodiment of the actuator of FIG. 5.

In FIGS. 5 and 5A, the plurality of individual pistons are replaced with a single, annular piston 80. The annular piston 80 is disposed in an annular bore 82 with appropriate seals (not shown). The annular bore 82 connects with the annular passage 30 within which the heater element 32 is disposed.

Figure 5B:
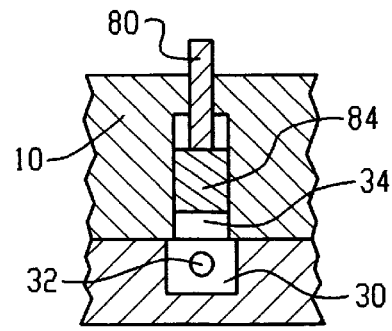
FIG. 5B illustrates a cross-section of another embodiment of the actuator of FIG. 5.

In the embodiment of FIG. 5B, the annular passage 30 is connected with a plurality of bores 34. A piston, bellows, diaphragm, or other movable member 84 is slidably disposed in each bore with appropriate seals (not shown). The bores 34 extend between the annular path 30 and an annular groove in the housing in which the annular piston member 80 is slidably disposed. In this manner, a plurality of piston or other extensible elements 84 are disposed between the polymer ring 30 and the annular piston 80.

Figure 6:
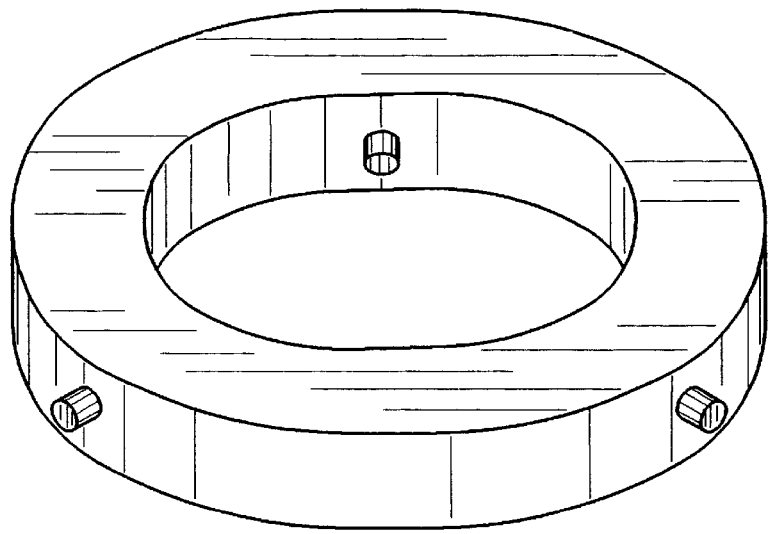
FIG. 6 illustrates another alternate embodiment of the thermochemical/mechanical actuator in which force is transmitted radially.

With reference to FIG. 6, it is to be appreciated that the extensible members 12 need not extend longitudinally. Rather, the members can extend radially outward from the housing member 10, radially inward, or both. A member with outward radially moving extension members can be utilized as a drum brake element, a clutch which engages a surrounding clutch cylinder, or the like. The embodiment with radially inward extending members can be utilized as a collar brake or clutch to engage a shaft extending therethrough. The inward, radially extending members may also engage elements of a chuck for engaging tools or workpieces, or the like.

Figure 7:
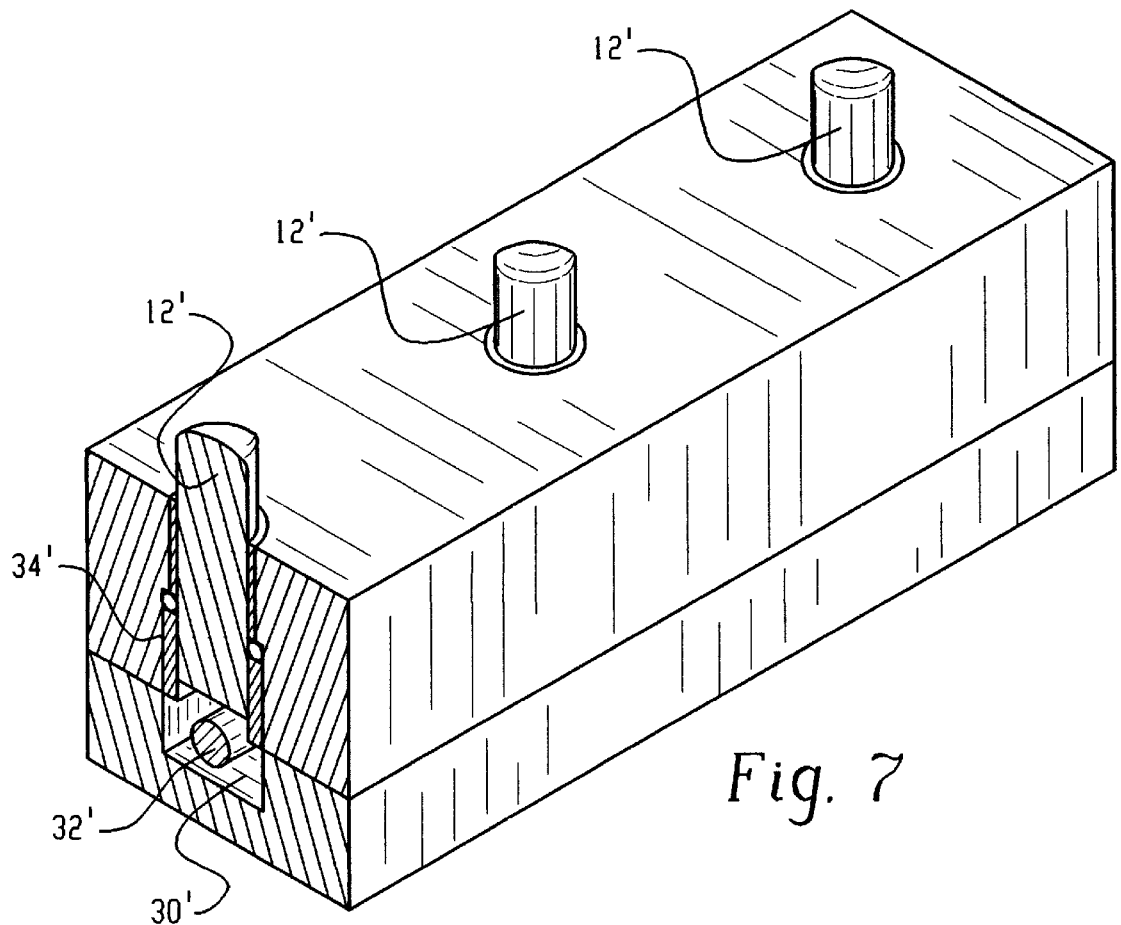
FIG. 7 illustrates an alternate, linear embodiment of the actuator; and, FIG. 8 illustrates an alternate, triangular version of the actuator.

With reference to FIG. 7, it is to be appreciated that the passage 30 need not be a full annulus, and need not be annular. Rather, an elongated passage 30' of another shape, such as linear, extends between a plurality of bores 34'. Extensible members 12' are disposed within each of the bores with appropriate seals. The extensible members can extend from a common side of the body to provide a linear pressing movement. Alternately, the extensible members 12' can extend from opposite sides of the body member to create force in two directions to increase the effective travel of the actuator.

Figure 8:
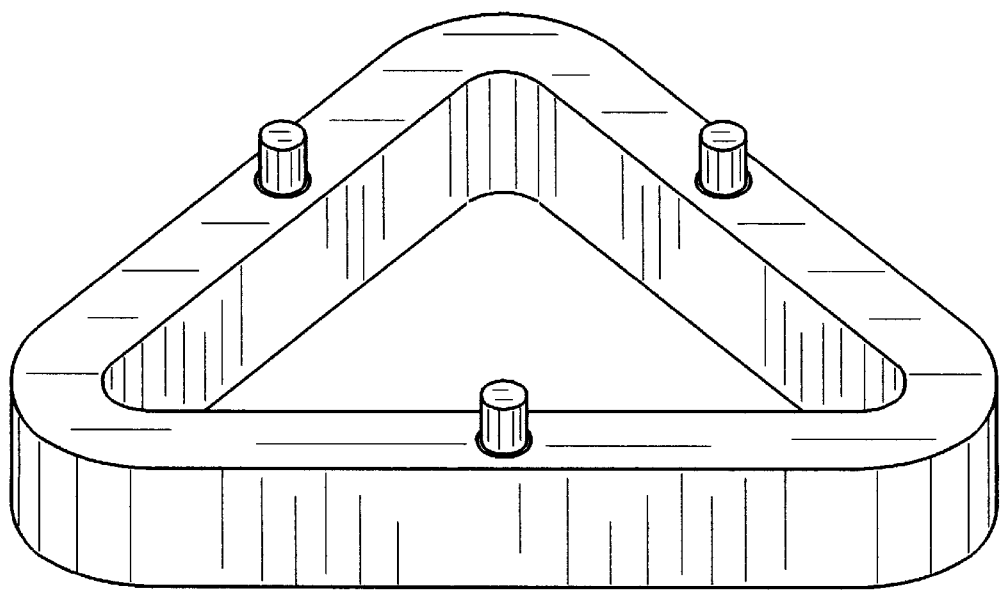

The elongated passage may have other shapes than linear and circular. In general, the passage may extend between any two or more points at which extensible members are to be extended with like force characteristics. For example, as shown in FIG. 8, the elongated path may extend along a triangular shape. Bores with extensible members can be located at various points along the triangle such as at the midpoints, the corners, or the like. Other patterns such as square, rectangular, hexagonal, irregular, and the like are also contemplated.

The invention has been described with reference to the preferred embodiment. obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An electromechanical actuator comprising:
    an elongated passage containing a solid polymeric material which melts, expands, and flows when heated;
    an elongated, electrical heater element disposed within and extending along the elongated passage such that when the heater is actuated, melted polymeric material flows along the elongated heater element and the passage equalizing pressure along the elongated passage;
    a plurality of polymer-filled chambers in fluid communication with the elongated passage such that expanding and melted polymeric material flows from the passage into the chambers;
    an extensible member mounted at each chamber and acted upon by the expanding and melted polymeric material such that the expanding and melting polymeric material exerts a common pressure on each of the extensible members urging each extensible member to extend simultaneously with a common force.

2. The actuator as set forth in claim 1 wherein the elongated passage includes at least one linear segment.

3. The actuator as set forth in claim 1 wherein the elongated passage is annular.

4. The actuator as set forth in claim 3 wherein the extensible members extend longitudinally from the annular passage.

5. The actuator as set forth in claim 1 wherein the extensible members extend in a common direction.

6. An electrochemical actuator comprising:
    a body member which defines an elongated passage containing a polymeric material which expands and flows when heated;
    a heater element disposed along the elongated passage;
    a Plurality of chambers in fluid communication with the elongated Passage;
    an extensible member mounted at each chamber such that as the polymeric material expands and flows, a common force is exerted on each of the extensible members urging each extensible member to extend, one of the extensible members and the body member which defines the elongated passage selectively engaging a thrust bearing urging frictional contact between selectively mating friction members.

7. The actuator as set forth in claim 5 wherein at least one of the thrust bearing and the mating member are connected with a rotatable shaft.

8. An electrochemical actuator comprising:
    an annular passage containing a polymeric material which expands and flows when heated;
    a heater element disposed along the annular passage;
    a plurality of extensible members mounted in fluid communication with the annular passage and extending in a radial direction such that as the polymeric material expands and flows, a common force is exerted on each of the extensible members urging each extensible member to extend.

9. An electrochemical actuator comprising:
    an elongated passage containing a polymeric material which expands and flows when heated;
    a heater element disposed along the elongated passage:
    a plurality of chambers in fluid communication with the elongated passage;
    extensible members extending from the chambers in opposing directions such that as the polymeric material expands and flows, each extensible member is urged to extend with a common force.

10. An electrochemical actuator comprising:
    an elongated path containing a polymeric material which expands and flows when heated;
    a heater element disposed along the elongated path, the heating element including:
        a resistive element extending along the elongated path;
        an electrical insulator surrounding the resistive element; and,
        an electrically conductive sheath surrounding the electrical insulators
    a plurality of extensible elements mounted in fluid communication with the elongated path such that as the polymeric material expands and flows, the extensible elements are urged to extend with a common force.

11. An electrochemical actuator comprising:
    an elongated passage containing a polymeric material which expands and flows when heated;

a heater element disposed along the elongated passage, the heating including:
  a thin insulator element having a plurality of apertures therethrough; and,
  a plurality of resistive wires extending in a spaced relationship relative to each other along the thin insulator element spanning the apertures;
a plurality of chambers in fluid communication with the elongated passage;
an extensible member mounted at each chamber such that as the polymeric material expands and flows, a common force is exerted on each of the extensible members urging each extensible member to extend.

12. The actuator as set forth in claim 11 wherein the heater element further includes an adhesive layer for bonding the electrical resistive wires to the thin insulator element in the spaced apart relationship.

13. The actuator as set forth in claim 11 wherein the spaced apart resistance wire windings are inductively coupled with a source of electrical power.

14. A clutch assembly including:
first and second clutch members which are selectively movable between a frictional engaging relationship and a spaced, disengaged relationship:
an actuator for selectively moving the clutch members between the spaced disengaged relationship and the frictional engaging relationship, the actuator including:
  a housing which defines an elongated passage therein;
  a plurality of extensible members mounted in pressure transmissive communication with the elongated passage for selective movement between a retracted position and an extending position;
  a polymeric material filling the elongated passage, which polymeric material expands and flows with controllable heating exerting a common, controllable pressure on the extensible members;
a common electrical heater element disposed in the elongated passage for controllably heating the polymer in the elongated passage such that the polymer flows along the elongated passage exerting the common, controllable pressure on the plurality of members concurrently.

15. The clutch assembly as set forth in claim 14 wherein the housing member includes a plurality of chambers in fluid communication with the elongated passage, each chamber containing the polymeric material and interacting with one of the extensible members.

16. A brake assembly including:
first and second brake members which are selectively movable between a frictional engaging relationship and a spaced, disengaged relationship;
an actuator for selectively moving the plates from the spaced disengaged relationship to the frictional engaging relationship, the actuator including:
  a housing which defines at least one chamber therein;
  an extensible member mounted at least partially within the chamber for selective movement between a retracted position and an extending position;
  a polymeric material disposed in the chamber below the extensible member, which polymeric material expands and flows on heating;
  a heater disposed in thermal communication with the polymeric material.

17. The brake assembly as set forth in claim 16 wherein the housing includes a plurality of chambers each containing the polymeric material and an extensible member.

18. The brake assembly as set forth in claim 17 further including an elongated passage interconnecting the chambers.

19. The brake assembly as set forth in claim 18 wherein the elongated passage is filled with the polymeric material and the heater includes a common heater element disposed in the elongated passage for selectively heating the polymer in the elongated passage and the chambers concurrently.

20. A method of selectively moving first and second clutch members into a frictional engaging relationship and retracting the first and second clutch members into a spaced, disengaged relationship, the method comprising:
controllably supplying electrical power to an electrical heater element which extends along an elongated passage that is filled with a polymeric material such that the polymeric material expands and flows along the heater element and the elongated passage creating a common, controllable pressure along the passage;
communicating the common, controllable pressure of the polymeric material to a plurality of extensible members such that the plurality of extensible members extend concurrently, with a common controllable force, urging the first and second clutch members into the frictional engaging relationship;
reducing the supply of electrical power to the heater element allowing the polymeric material to contract, contraction of the polymeric material permitting retraction of the extensible members such that the first and second clutch members move to the spaced, disengaged relationship.

21. A method of braking comprising:
heating a polymeric material disposed in a chamber;
heating of the polymeric material causing the polymeric material to expand and flow creating a pressure in the chamber;
applying the created pressure to an extensible member to move the extensible member from a retracted position to an extending position;
using the movement of the extensible member to move first and second brake elements into a frictional engaging, braking relationship;
stopping the heating of the polymeric material such that the polymeric material cools and contracts permitting the first and second brake members to move to a disengaged, non-braking relationship.

* * * * *